Dec. 18, 1951 W. A. REASER ET AL 2,579,337

MACHINE FOR EDGE GRINDING PLATES

Filed April 13, 1949 10 Sheets-Sheet 1

INVENTORS:
William A. Reaser,
Elmer A. Ziems,
John M. Christman.
BY Owen & Owen
ATTYS.

Dec. 18, 1951 W. A. REASER ET AL 2,579,337

MACHINE FOR EDGE GRINDING PLATES

Filed April 13, 1949 10 Sheets-Sheet 2

INVENTORS:
William A. Reaser,
Elmer A. Ziems,
John M. Christman.
BY Owen & Owen,
ATTYS.

MACHINE FOR EDGE GRINDING PLATES

Filed April 13, 1949 10 Sheets-Sheet 3

INVENTORS:
William A. Reaser,
Elmer A. Ziems,
John M. Christman.
BY Owen & Owen,
ATTYS.

Dec. 18, 1951 W. A. REASER ET AL 2,579,337

MACHINE FOR EDGE GRINDING PLATES

Filed April 13, 1949 10 Sheets-Sheet 4

INVENTORS:
William A. Reaser,
Elmer A. Ziems,
John M. Christman.

BY Owen & Owen

ATTYS.

Dec. 18, 1951 W. A. REASER ET AL 2,579,337

MACHINE FOR EDGE GRINDING PLATES

Filed April 13, 1949 10 Sheets-Sheet 5

INVENTORS:
William A. Reaser,
Elmer A. Ziems,
BY John M. Christman.

Owen & Owen

ATTYS

MACHINE FOR EDGE GRINDING PLATES

Filed April 13, 1949 10 Sheets-Sheet 6

INVENTORS:
William A. Reaser,
Elmer A. Ziems,
BY John M. Christman.
Owen & Owen
ATTYS.

MACHINE FOR EDGE GRINDING PLATES

Filed April 13, 1949 10 Sheets-Sheet 7

INVENTORS:
William A. Reaser,
Elmer A. Ziems,
John M. Christman.
BY Owen & Owen,
ATTYS.

MACHINE FOR EDGE GRINDING PLATES

INVENTORS:
William A. Reaser,
Elmer A. Ziems,
John M. Christman.
BY Owen & Owen,
ATTYS.

Dec. 18, 1951 W. A. REASER ET AL 2,579,337

MACHINE FOR EDGE GRINDING PLATES

Filed April 13, 1949 10 Sheets-Sheet 9

INVENTORS:
William A. Reaser,
Elmer A. Ziems,
BY John M. Christman.
Owen & Owen
ATTYS.

Dec. 18, 1951 W. A. REASER ET AL 2,579,337

MACHINE FOR EDGE GRINDING PLATES

Filed April 13, 1949 10 Sheets-Sheet 10

INVENTORS:
*William A. Reaser,*
*Elmer A. Ziems,*
BY *John M. Christman.*

*Owen & Owen,*

ATTYS.

UNITED STATES PATENT OFFICE 2,579,337

MACHINE FOR EDGE GRINDING PLATES

William A. Reaser, Toledo, and Elmer A. Ziems, Rossford, Ohio, and John M. Christman, Grosse Pointe, Mich., assignors to The Sun Tool & Machine Company, Toledo, Ohio, a corporation of Ohio Application April 13, 1949, Serial No. 87,242

12 Claims. (Cl. 51—101)

This invention relates to machines for shaping or finishing the edges of glass plates or the like, and particularly, but not necessarily, such plates that are of shapes other than round.

An object of the invention is the provision of an improved, simple and efficient machine of this character which employs a single abrading wheel, or a plurality of such wheels operating in tandem, to finish, bevel or otherwise treat the continuous edge of the plate, as for instance by rounding or beveling the edge, or both.

Figure 1:
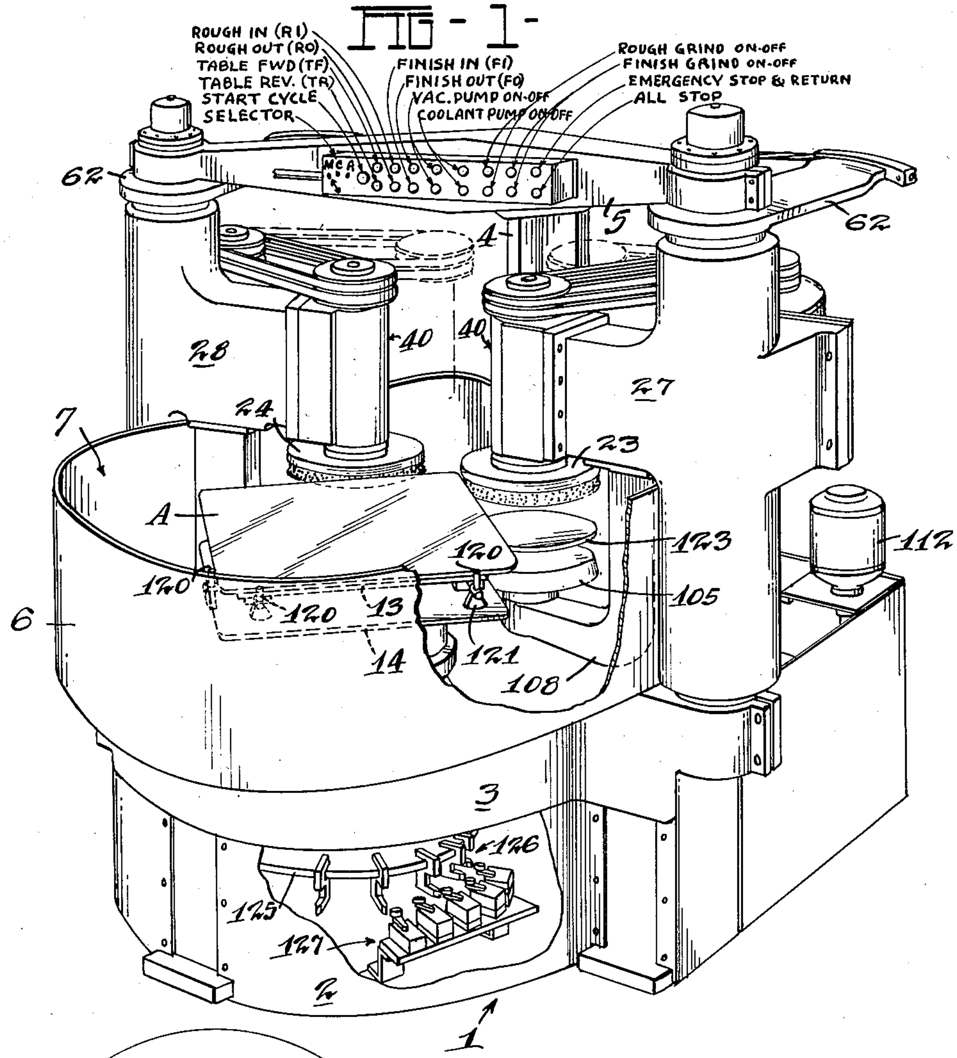
Figure 21:
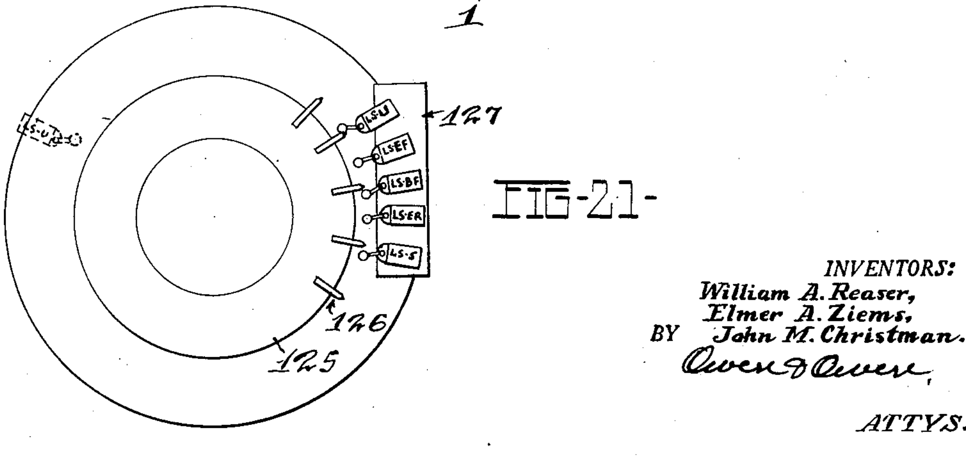
Figure 2:
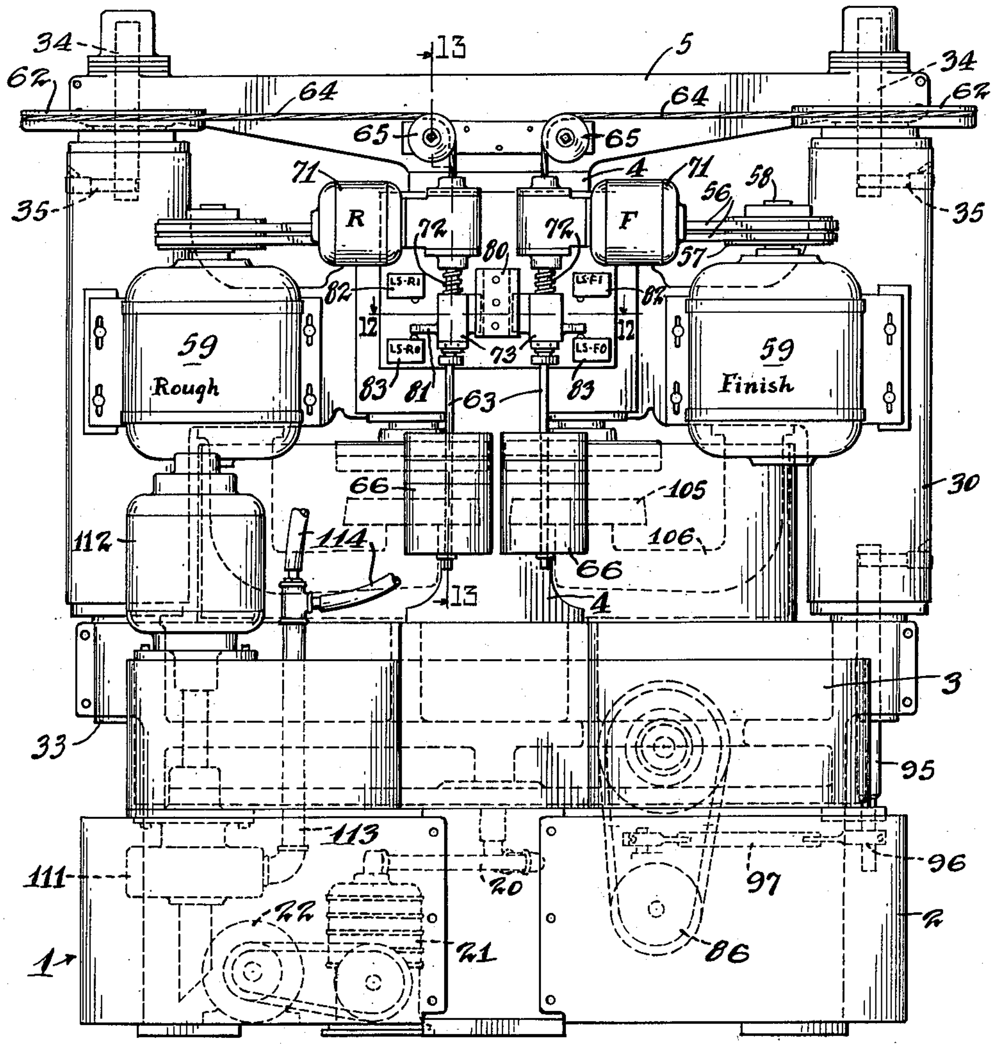
Figures 3, 4:
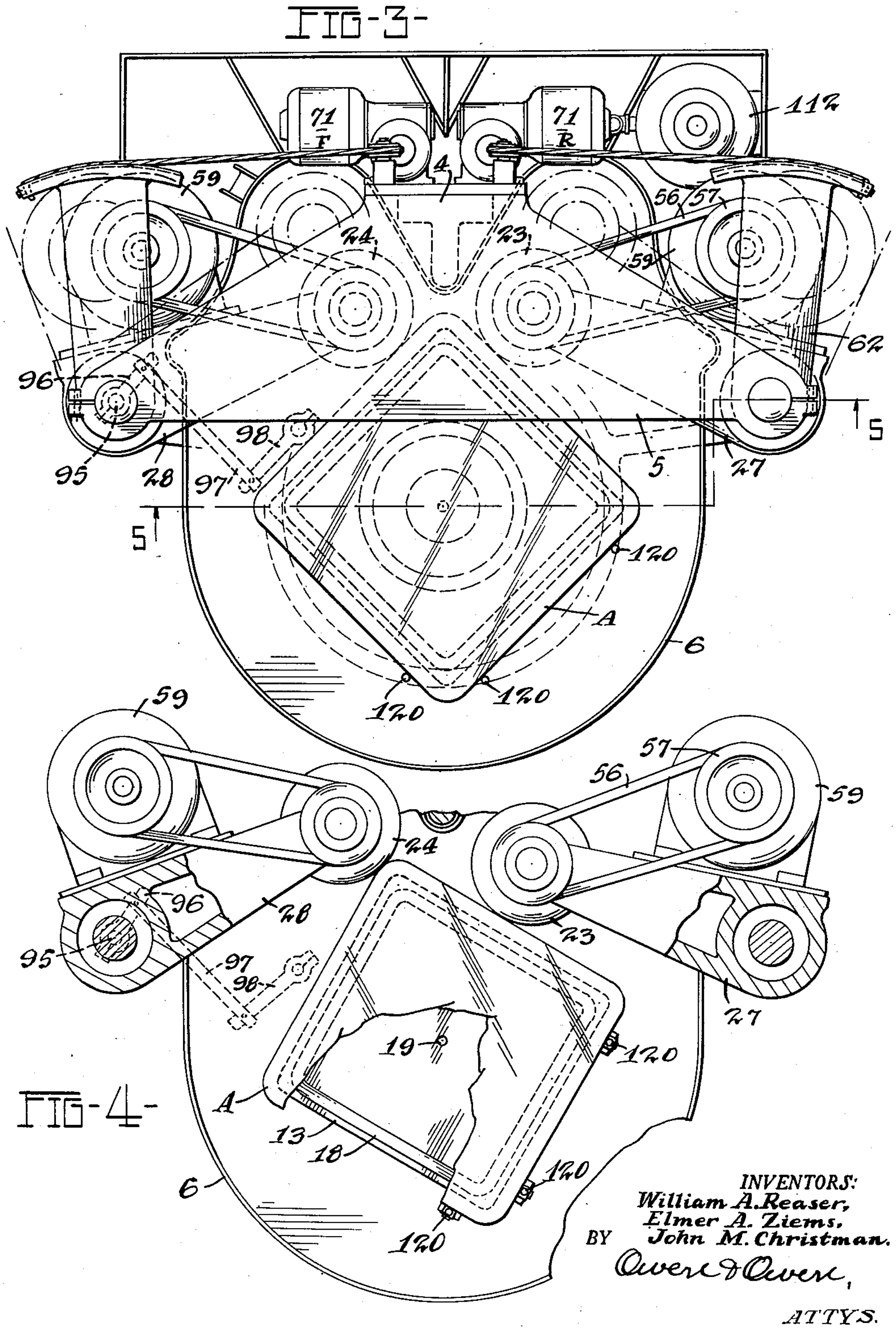
Figure 5:
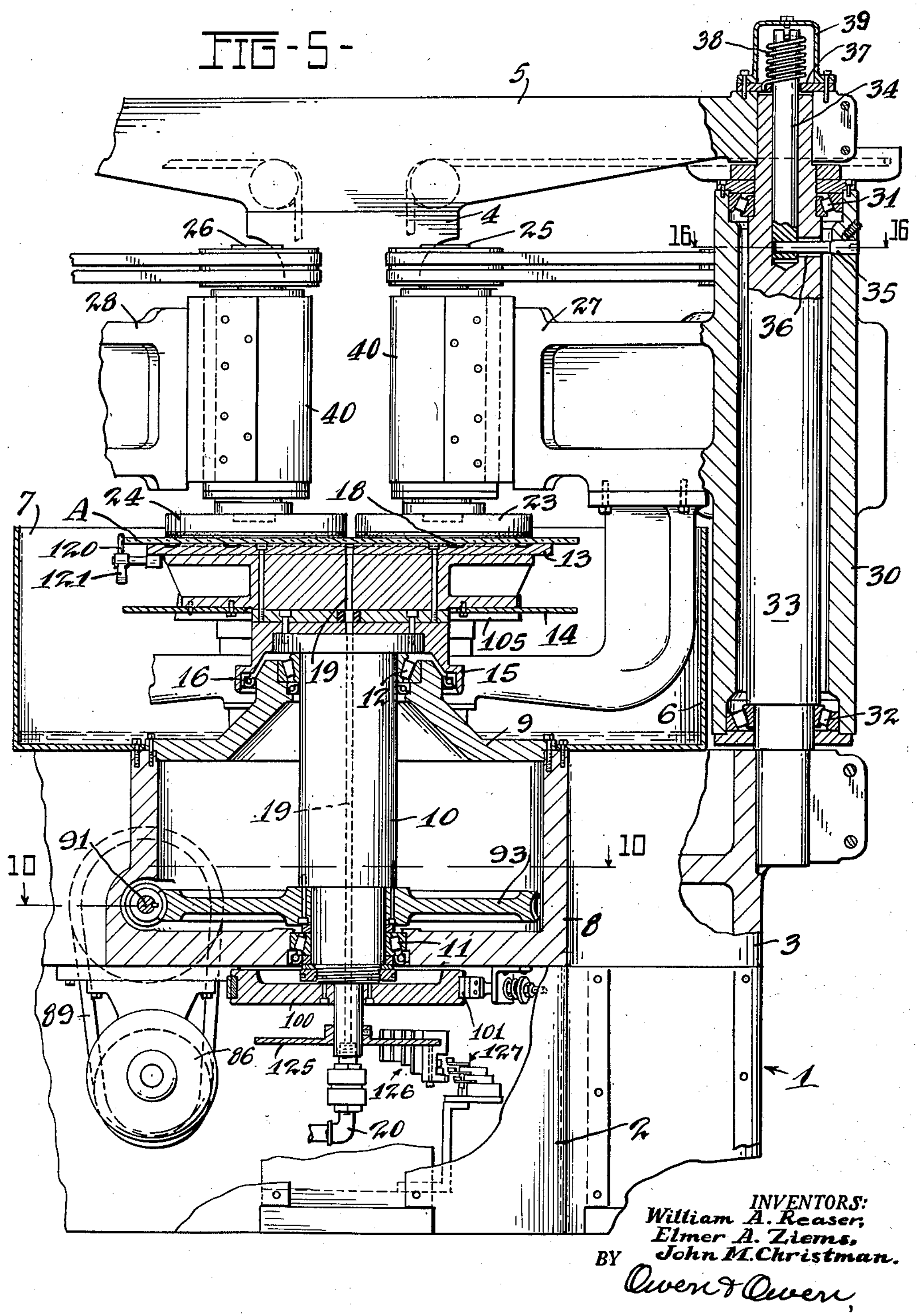
Figure 6:
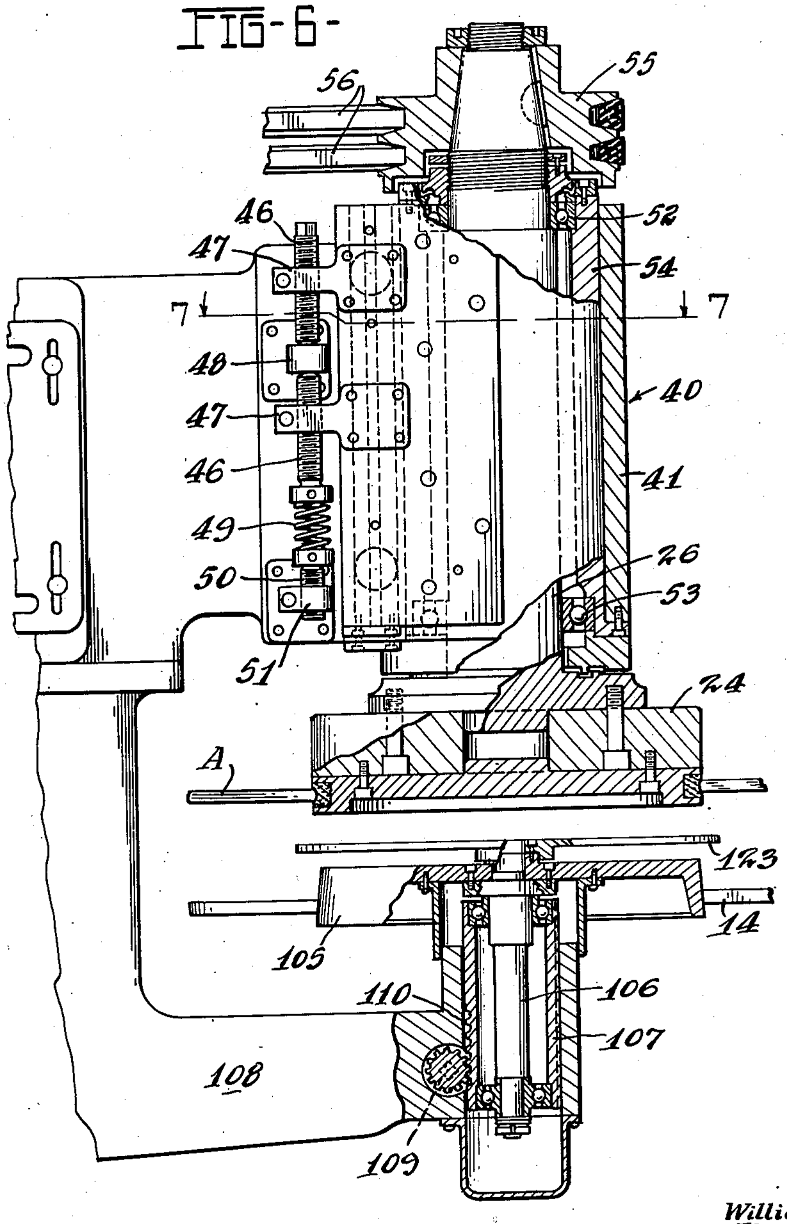
Figure 17:
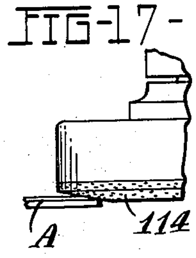
Figures 7, 8, 9:
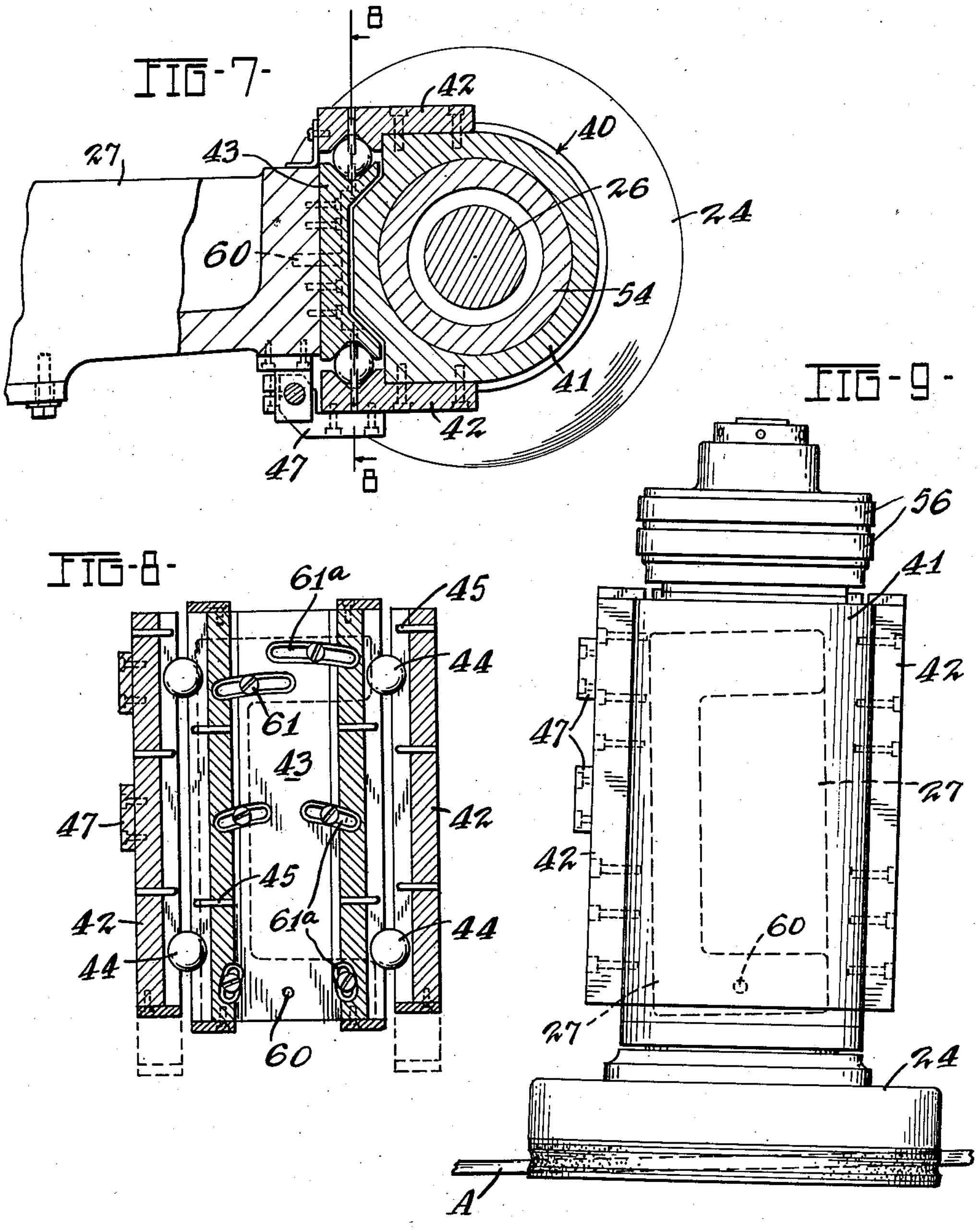
Figures 10, 11:
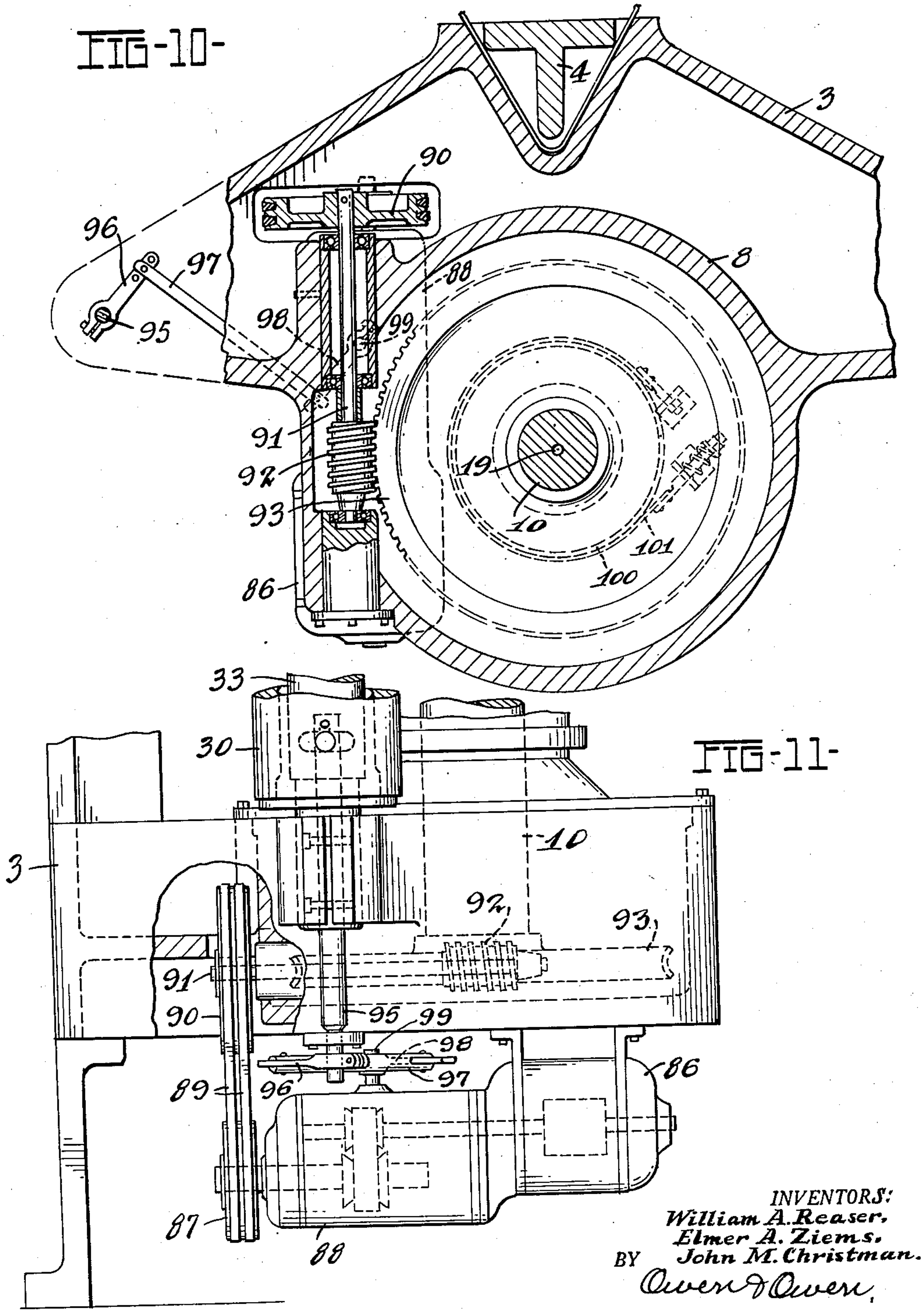
Figure 12:
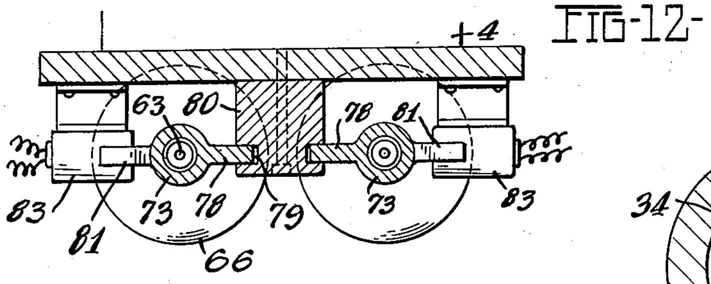
Figure 16:
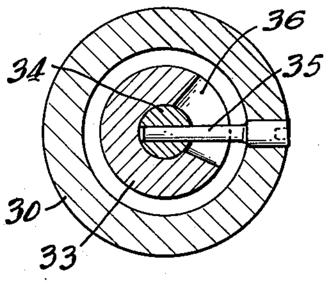
Figures 13, 14:
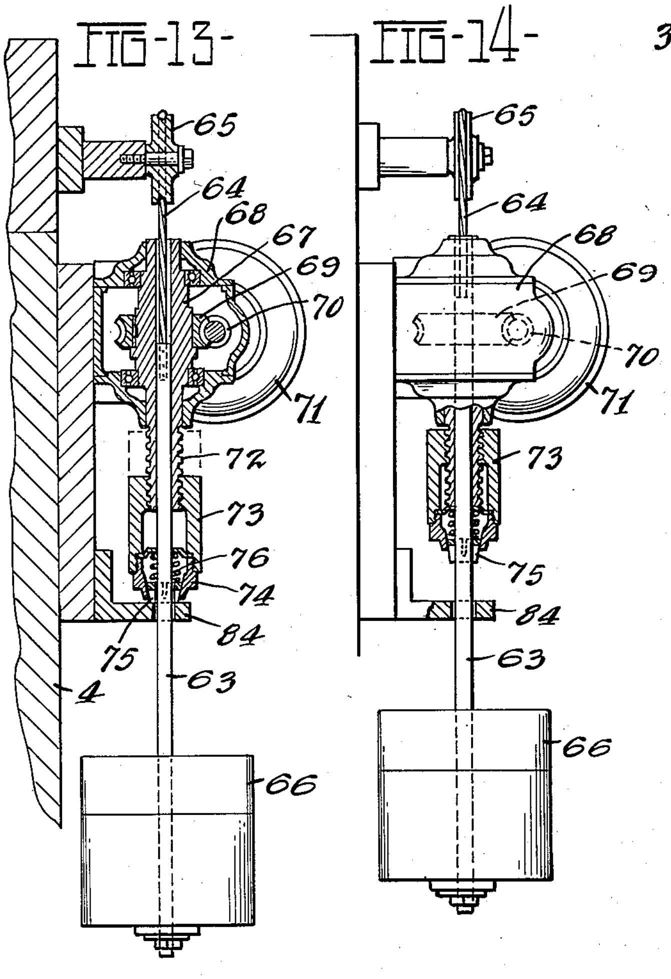
Figure 15:
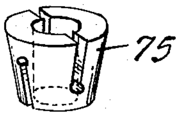
Figure 18:
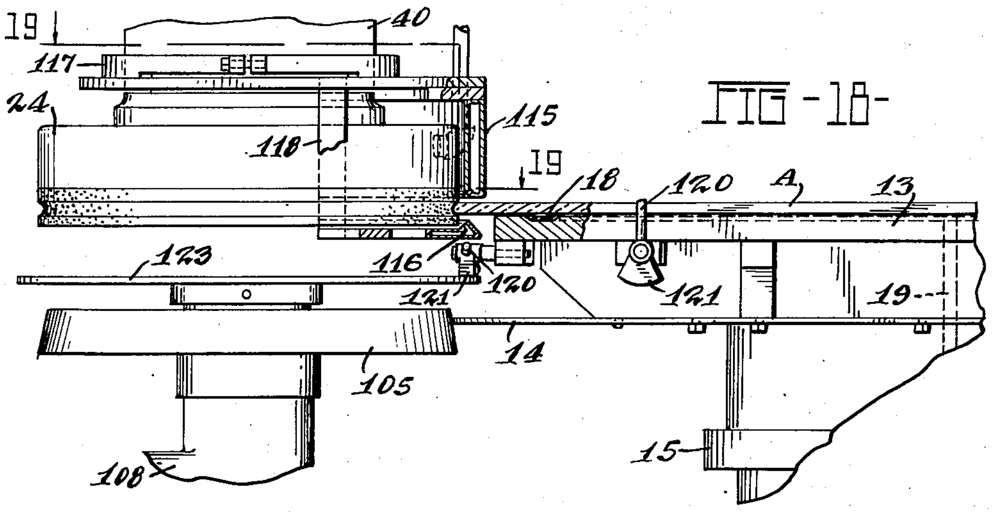
Figure 19:
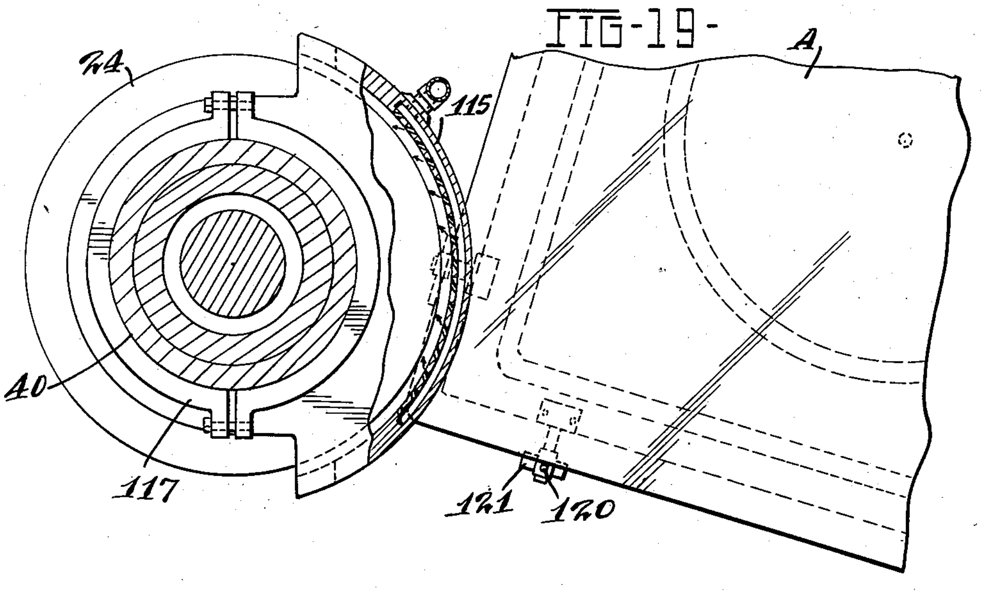
Figure 20:
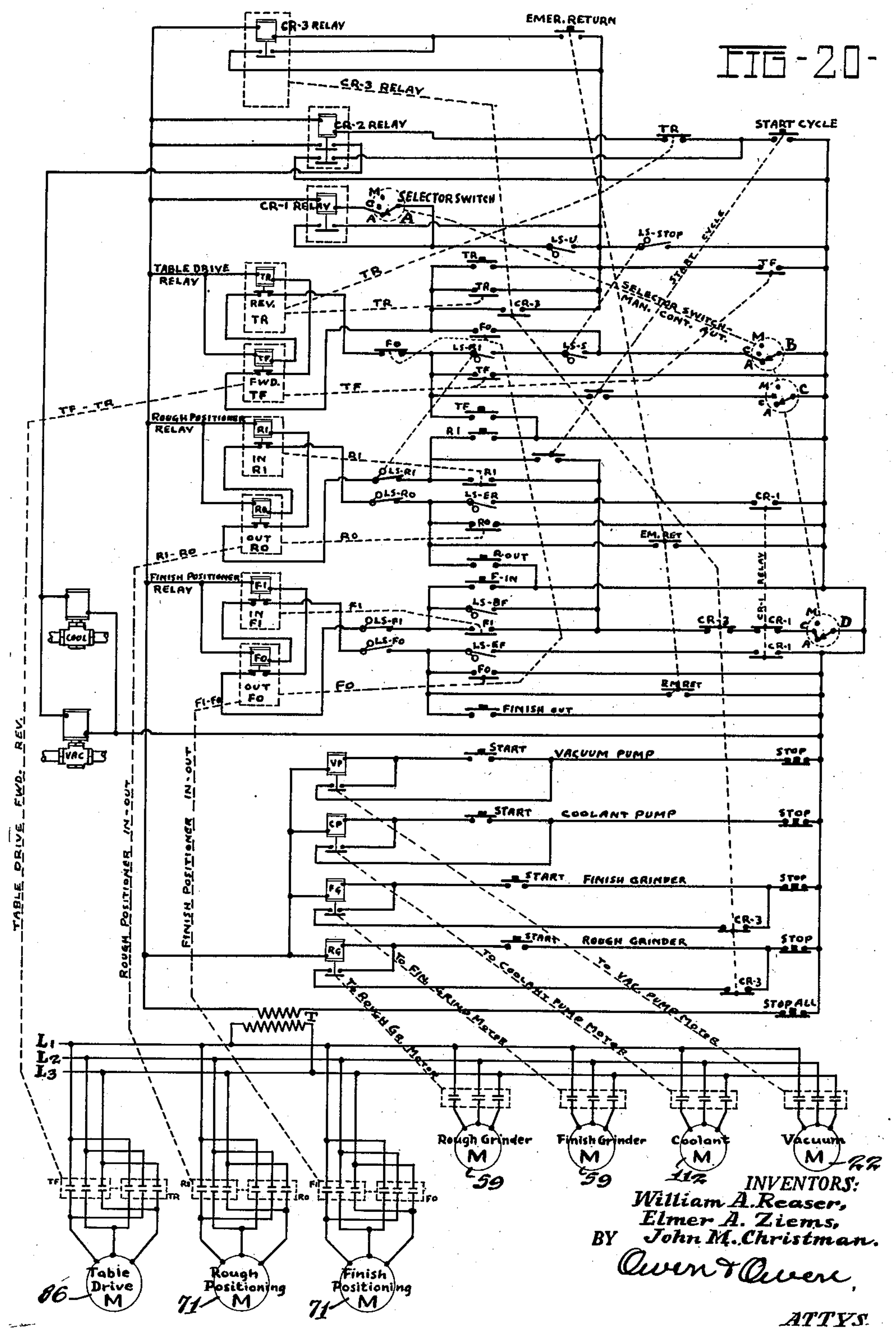

Other objects and advantages of the invention will be apparent from the following detailed description and from the accompanying drawings illustrating one embodiment thereof, in which:

Fig. 1 is a front perspective view of a machine embodying the invention, with parts broken away and with the abrading wheels in edge grinding engagement with a work plate; Fig. 2 is a rear elevation of the machine; Fig. 3 is a top plan view thereof, with the retracted positions of the abrading wheels shown in dotted lines; Fig. 4 is a similar view, with parts broken away; Fig. 5 is an enlarged fragmentary front elevation, with parts in section on the line 5—5 in Fig. 3; Fig. 6 is an enlarged fragmentary side view of the free end portion of one of the swinging abrading head arms, with parts broken away; Fig. 7 is an enlarged fragmentary cross-section on the line 7—7 in Fig. 6; Fig. 8 is a section on the line 8—8 in Fig. 7; Fig. 9 is an outer end elevation of a grinding head carrying arm showing the grinding head in tilted position; Fig. 10 is a cross-section on the line 10—10 in Fig. 5, with parts broken away and showing the table drive means; Fig. 11 is a fragmentary side elevation of the machine, with parts broken away and showing the table drive means; Fig. 12 is a horizontal section on the line 12—12 in Fig. 2; Fig. 13 is a vertical section on the line 13—13 in Fig. 2; Fig. 14 is a view in different elevation of the parts shown in Fig. 13, with parts broken away; Fig. 15 is an enlarged perspective view of the collet member shown in Figs. 13 and 14; Fig. 16 is an enlarged cross-section on the line 16—16 in Fig. 5; Fig. 17 is a fragmentary side view of an abrading wheel adapted for bevel grinding and shown in edge beveling engagement with a work plate; Fig. 18 is an enlarged fragmentary view, with parts in section, of a work-supporting table with its work-piece and template in engagement with a grinding wheel and guide wheel, respectively, and showing the associated coolant nozzle; Fig. 19 is a section on the line 19—19 in Fig. 18; Fig. 20 is an electric wiring diagram for the machine, and Fig. 21 is a diagram showing limit switches controlled by table rotation.

The present invention in its general construction and operation comprises a rotary table on which the plate to be acted on is mounted by suction or otherwise, with its edge exposed, and with which table is associated a template to turn therewith and which defines the peripheral shape of the finished plate. An edge roughing wheel and a finishing wheel are positioned to successively act on the plate edge as it is turned. These wheels, in the present instance, have diamond edge abrading portions and are mounted for swinging movements transverse to their axes to independently follow the irregular, or other than circular, perimeter of the plate. The separate swinging means carrying the wheels are biased by spring action to normally hold the wheels retracted from the work and are acted on by automatically controlled weight biasing means to move the abrading wheels to, and to yieldingly hold them in, engagement with an edge of the work. The work-carrying table is driven by a speed change mechanism that is connected to the swinging arm which carries the finishing abrading wheel and is so coordinated with the swinging movements of such arm that the table speed is decreased as the wheel approaches and passes around protuberant portions, such as corners of the work and plate, and is increased as it passes along the straight side portions of a square plate, as in the present instance, or along reentrant or concaved edge portions of plates of other shapes.

Referring to the drawings, 1 designates the hollow base frame of a machine embodying the invention, and comprises, in the present instance, two superimposed sections 2 and 3 mounted one on top of the other. Rising centrally from the rear end portion of the base frame is a T-frame having the upright or leg portion 4 and the top cross-arm portion 5 with the arms thereof projecting in opposite directions from the upright and slightly forward therefrom, as shown in Fig. 3. The forward portion of the base frame is shown as rounded in semicircular form in a horizontal plane, and this portion is provided on its top with an upstanding edge apron 6 forming an open top chamber 7.

The base section 3 (Fig. 5) has a centrally disposed cylindrical cup-shaped part 8 that is closed at its upper open end by a removable top member 9. A vertical shaft 10 is mounted centrally in the frame part 8 in bottom and top bearings 11, 12, therein, respectively, and is provided at its upper end within the chamber 7 with a work supporting table 13 and below such table with a template 14 to turn therewith. The central portion of the top member 9, with its bearing 12, is raised above the bottom of the chamber 7, so that water will drain outwardly therefrom away from the bearing 12. Said bearing is further sealed or protected from water in the chamber 7 by a skirt portion 15 on the shaft depending around the raised bearing portion and by a gasket 16 therebetween.

While the table 13 may be of any desired shape, it is shown in the present instance as square to permit a glass plate or other work-piece A, which is to be edge ground, to be clamped thereto with its edge projecting beyond the table edge. It is preferable to hold the work plate to the table top by suction action. For this purpose, the top of the table is provided with an endless slightly raised rubber or other suitable sealing strip 18 against which the bottom flat surface of the glass work plate may rest. This forms a sealed compartment between the plate and table that is in communication with a suction source through a passage 19 in the table and shaft. The lower end of this passage, in the present instance, is in communication through a connection 20 with a vacuum pump 21 located within the base of the machine and driven by a motor 22, as shown in Fig. 2.

The abrading means, in the present instance, includes a rough grinding wheel 23 and a finishing wheel 24 carried at the lower ends of respective spindles 25 and 26 mounted vertically in the outer adjacent ends of respective swinging arms 27, 28 (Figs. 1 and 5 to 9). The arms 27 and 28 project inward from the respective right and left sides of the machine, and inasmuch as their mounting and construction are identical, a description of one and its mounting will be sufficient.

Each arm at its inner or pivoted end is provided with a vertically elongated bearing sleeve 30 (Fig. 5) that has bearings 31 and 32 on the upper and lower ends, respectively, of a vertical shaft 33 that is disposed between and is mounted at its respective ends in the adjacent side of the base frame 3 and the adjacent end of the cross-arm 5. This shaft is rigid with respect to the frame parts, having a lower stud end projecting into and clamped to a receiving portion of the base frame and having an upper stud end projecting into a clamping portion on the arm end.

A stem 34 projects down into a central upper end opening of the shaft 30 and has a pin 35 (Figs. 5 and 16) fixedly projecting rigidly from its lower end through a segmental slot 36 in the shaft 33 and with its outer end anchored in an opening in the arm sleeve 30. The upper end of the stem 34 projects through and above a plate 37 fixed to the top of the respective end of the cross-arm 5 through a coiled tension spring 38, one end of which is anchored to the plate 37 and the other to the stem. The tension of this spring on the stem 34 is such that it tends to turn the arm 27 or 28 in a rearward retracting direction away from the work table and through a range of movement permitted by the slot 36. The upper end of the stem 34 and spring 38 are enclosed within a cap 39. The means for moving the arms 27 and 28 in the opposite direction will be hereinafter described.

The spindle carrying head 40 at the outer end of each arm 27, 28, is mounted on the arm for vertical adjustment and also for tilting adjustment in a vertical plane which is transverse to the longitudinal axis of the arm. The head includes a body part 41 (Figs. 7 and 9) which has bearing plates 42 at its inner side edges that lap the outer side edges of a bearing plate 43 mounted on the arm end. The plates 42 and 43 have registering vertically disposed raceways in which a plurality of bearing balls 44 are mounted to permit vertical adjustment of the head 40 relative to the plate 43. This adjustment is limited by the provision of spaced pins 45 projecting into such raceways at intervals from the respective plates and above and below the balls. For the purpose of manual vertical adjustment of a head 40 relative to its carrying arm, including the plate 43, the head is provided at one side with upper and lower adjusting screws 46 that are threaded vertically through respective bosses 47 projecting from one of the plates 42 at a side of the adjacent end portion of the arm and bearing at their inner ends against a boss 48 on the arm, as shown in Figs. 6 and 7. It is thus apparent that an adjustment of the screws relative to the boss 48 will adjust the head 40 up or down in its bearing. It is preferable to provide a coiled expension spring 49 between the outer end of the lower screw 46 and the head of a screw 50 that is threaded vertically through a boss 51 on the lower edge portion of the head carrying arm. The spring 49 cushions and yieldingly supports the head with respect to the arm when the screws 46 are loosened, and the screw 50 serves as a tension adjusting means for the spring. By turning the screws 46 and 47 out relative to the boss 48, the spring 49 may then serve as a floating support for the head, which is sometimes desirable.

Each spindle 25, 26, is journaled in upper and lower bearings 52, 53, in the respective edge sleeve 54 mounted in the head part 41, and the upper end of the spindle projects above the head and carries a belt pulley 55 that is connected by one or more belts 56 to a pulley 57 on the upper end of a shaft 58 of a respective drive motor 59 (Figs. 5 and 6), one of which is mounted on the rear side of each swinging arm.

It is desirable to sometimes transversely tilt or adjust the head 40 so that the axis of the abrading wheel will be slightly out-of-normal with the plane of the plate A being ground. Such adjustment is illustrated in Fig. 9 and is accomplished by a tilting of the plate 43 and parts carried thereby relative to the associated swinging arms 27, 28. For this purpose, the plate 43 has a pivotal connection with the arm end at 60 (Figs. 7, 8 and 9), and the plate is held in adjusted relation to the arm by a series of screws 61 extending through respective segmental slots 61a in the plate and threading into the end of the arm (Fig. 8). The slots 61a are concentric to the pivot 60.

The means for swinging the arms 27 and 28 forward to abrading position and causing the abrading wheels to yieldingly engage the edge of the work with a constant pressure action will now be described. This means includes an arm 62 projecting rearwardly from the upper end of each swinging arm to move therewith, and it is connected at its outer end to a respective vertical weight rod 63 through a flexible cable 64 operating over a guide sheave 65 mounted on the rear of the frame cross-arm 5 adjacent to its center, as shown in Figs. 1, 2, 13 and 14. The rod 63 at its lower end carries a weight 66 which exerts a predetermined gravity force on the rod. Each rod 63 extends for vertical movements through the central opening of a hub sleeve 67 that is mounted for free rotation in a gear case 68 mounted on the rear of the frame upright 4 (Figs. 13 and 14). Mounted on the sleeve 67 within the case 68 is a worm wheel 69 that is in mesh with and driven by a worm wheel 70 the shaft of which is the rotor shaft of a respective electric motor 71. The sleeve 67 extends through the bottom of the case 68 and has a threaded extension part 72 engaging a nut 73. This nut is cup-shaped and at its lower end carries a tapered collet member 74 at such end through which the rod 63 extends. A movable tapered clutch collet 75 encircles the rod 63 and is mounted for axial movement in the member 74 and projects at its lower restricted end below said member. A coiled expansion spring 76 has its opposite ends thrust against the collet member 75 and an inner part of the nut 73 to exert a yielding outward pressure against the movable collet member. Such member is of split form to adapt it, when forced outward in the tapered portion of the member 74, to have a contracting gripping action against the rod 63 whereby the rod is held against axial movement relative to the nut.

The motors 71 are of the reversing type and when the sleeve 67 is driven in one direction the nut 73 is fed downward and when the sleeve is turned in the opposite direction the nut is fed upward. The nut 73 is held against turning by a finger 78 projecting from one side thereof and traveling in a guide groove 79 in a frame part 80 (Fig. 12). A finger 81 projects from the opposite side of each nut 73 and at the limit of upward movement of the nut engages a limit switch 82 (LS—RI and LS—FI) in circuit with the associated motor 71 and effects a stopping of such motor, and when at the limit of its downward movement engages a limit switch 83 (LS—RO and LS—FO) in circuit with said motor and effects a stopping thereof. Just prior to the stopping of the downward movement of the nut, the lower projecting end of the movable collet 75 will have engaged a bracket 84 on the frame part 4 and have been moved up in the collet member 74 to rod-releasing position against the tension of the spring 76. This releasing of the weight rod 63 takes place when the associated abrading wheel is near work-engaging position, so that the abrading pressure will be exerted on the wheels by the gravity action of the weight. This permits a changing of the pressure of engagement of an abrading wheel with the work, to suit the conditions encountered, by merely changing the weights on the rod.

The drive for the spindle 10 carrying the work table is from an electric motor 86 which drives a pulley 87 through a speed changing means 88 (Fig. 11). The pulley 87 is in connection through a belt 89 with a pulley 90 on a worm shaft 91, the worm 92 of which is in mesh with a worm wheel 93 on the spindle 10 and within the frame part 8.

The speed changer 88 is controlled through a connection with the inner or pivoted end of the rocker arm 28, so that it will be operated to decrease the speed of turning of the table during a rearward swinging movement of the arm and will be operated to increase such speed during an inward swinging movement of the arm. This causes the turning speed of the table to decrease when the finishing wheel, in the present instance, is passing around a corner or protuberant portion of the work plate, and to increase when the wheel is traveling along a straight side edge portion or a reentrant portion of the work edge. This action is accomplished by mounting a stem 95 axially in the lower end of the shaft 33 for the arm 28 (Figs. 2, 3 and 4) to act on the arm sleeve 30 through a radial pin the same as the stem 34 and pin 35 at the upper end of the shaft, and attaching a rocker arm 96 to the lower end of the stem 95. This arm (Figs. 10 and 11) is connected by a link 97 to a rocker arm 98 on a shaft 99 extending upward from within the speed change mechanism. A rocking of the shaft 99 imparts the desired change speed action to the speed changer 88 in a manner well understood in the art. The shaft 10 (Fig. 5) is preferably provided at its lower end with a brake drum 100 with which a brake band 101 engages. This band is adjustable as to braking tension.

Below each abrading wheel 23, 24, is a respective template wheel 105 which rides at its periphery against the peripheral edge of the template 14. Each of these wheels is carried by a respective spindle 106 at its upper end (Fig. 6), which spindle is mounted for free rotation in a bearing sleeve 107 that is mounted for vertical adjusting movements in the outer end of an arm 108 projecting downward and outward from the under side of the respective abrading head carrying arm. The template wheel 105 has a broadened periphery that is tapered outwardly from its upper to its lower edge so that as wear occurs in the associated abrading wheel, such wear may be compensated for by a vertical adjustment of the wheel with respect to the template plate 14. The adjustment of the wheel is accomplished by a turning of a pinion 109 in engagement with a vertical rack 110 on a side of said sleeve.

In glass grinding apparatus, it is necessary to supply water to each abrading wheel at the point of its engagement with the work. In the present instance, such water is supplied by a rotary pump 111 (Fig. 2) mounted in the base frame part 2 and driven by a motor 112 mounted on the rear top portion of the frame part 3. The outlet 113 of this pump has two flexible branches 114 leading to the water discharging nozzles on the two rocker heads 40. In the present instance, each head is provided with an upper nozzle 115 and a lower nozzle 116 (Figs. 18 and 19), each of arcuate form and carried by the lower end of each head 40 in concentric relation to the respective grinding wheel 23, 24, and disposed in position for a plurality of discharge orifices of each to direct their discharging water jets against the abrading surface of the wheel at, and also in advance and at the rear of, the point of contact of the work edge therewith. The jets from the two nozzles are preferably discharged against the wheel periphery in a substantially tangential direction and intersect at approximately the peripheral line of contact of the work with the wheel. This is important in a diamond wheel grinding operation, as heat is generated very quickly at the point of grinding contact, and proper distribution of the coolant, such as accomplished by the present nozzles, is necessary to prevent the damaging results that would otherwise occur. The upper nozzle 115 is carried in adjacent concentric relation to the grinding wheel periphery by a clamp 117 that is engaged around the lower end of the head 40, and the lower nozzle 116 is suspended from this clamp at opposite sides thereof by arms 118 (Fig. 18).

The work plate A is positioned on the table 13 by three gauge pins 120, two being located at one side edge of the table in spaced relation lengthwise thereof and the other at an adjacent side of the table, as shown in plan in Figs. 3 and 4. Each pin is pivoted for vertical rocking movements on a respective stud, and its lower end is weighted as at 121, to cause the pin to normally stand in upright work-gauging position. As each pin moves adjacent to and past each grinding wheel 23, 24, it is swung out of wheel-engaging position by contact of its weighted end with a trip disc 123 mounted on the top of the respective template 105, as shown in Fig. 18.

A disk 125 is fixedly carried by the table shaft 10 below the brake drum 100 (Figs. 1, 5 and 21), and a plurality of striker fingers 126 are mounted on this disk to engage, at predetermined timed intervals during a rotation of the disk, respective electric limit switches 127 mounted in the base portion of the machine and which, for the purpose of identification, are designated LS—S, LS—ER, LS—BF, LS—EF and LS—U.

The machine is wired for both manual selective operation of the various motors and for automatic operation, and these operations will now be described.

For manual selective operation, the control for the selector switch, which control is shown at the left of the switch panel in Fig. 1, is moved to "M" position, which opens all points in the line at A, B, C and D (Fig. 20). All motors are now subject to individual operation. Push button controls for all moving parts of the machine are located on the switch panel in Fig. 1, and include table forward and reverse buttons (TF and TR), rough grinder "in" and "out" positioning buttons (RI and RO) and finishing grinder "in" and "out" positioning buttons (FI and FO). The drive motors 59, 59, for the rough and finish grinders (RS and FS), the coolant pump motor 112 (CP) and vacuum pump motor 22 (VP) have individual start and stop buttons with start interlocks. A pushing of emergency stop and return buttons, the switches of which are in circuit with relay CR—3, turns off both roughing and finishing grinder drive motors 59, cuts in both positioning motors 71, 71, to move rough and finishing grinders to "out" positions, and cuts in table drive motor 86 to return table to starting position. A pushing of the "stop-all" button, the switch of which is shown at lower right corner of diagram, opens the main line to all circuits.

For heavy work, when grinding cannot be completed in one turn of the table, the selector switch control is set at C, which opens lines at A and B, but closes line at C and D. Motors will now run continuously when started by pressing their respective buttons.

The operation of the machine with the selective switch set in position for automatic control is substantially as follows:

A work plate A having been clamped in proper abrading position on the top of the table 13, the operator first presses the start cycle switch button, which, as shown by dotted lines marked "start cycle" in diagram, closes the table drive circuit, the rough grinder positioning circuit and the CR—2 relay circuit, which latter interlocks the relay circuit around the start button and opens the valves indicated at the left of Fig. 20 in the coolant and vacuum lines. The limit switch 82 (LS—RI) in the rough grinder positioning circuit, which is now closed, allows current to flow through RO (rougher-out) relay contacts to rougher-in motor 71, so that the rough grinder swings in to work-grinding position.

When in this position, limit switch 82 (LS—RI) changes to reverse contacts to stop the inward positioning movement of the rough grinder and to start the table motor 86 in forward direction. The TF (table forward) relay now interlocks to maintain the forward drive circuit closed and to start the rough grinding operation. When the rough grinder on its inward positioning movement has reached grinding position, the associated collet 75 is released from engagement with the rod 63 by contact of such collet with the arm 84, thus permitting the weight to then act to yieldingly hold the rough grinder in grinding engagement with the edge of the work. When the table has turned a predetermined distance from starting position, the limit switch LS—BF is operated by its striker 126 in base of frame and closes circuit to finisher positioning relay FI to start associated positioning motor 71 to swing the finishing grinder into grinding position. When the finishing grinder has reached work-grinding position, the associated collet 75 will be released from the weight rod 63, thus permitting the finishing grinder to be yieldingly held in engagement with the work by the action of its weight 66. The rougher-in (RI) and finisher-in (FI) switches now remain closed, and when the table has turned approximately 180° from starting position, limit switch LS—U is contacted by its striker to throw CR—1 relay into circuit through TF contacts to make ready for subsequent table stop. When the table has turned 360° and the rough grinding cycle has been completed, the limit switch LS—ER is actuated by its striker and closes circuit to rough positioning motor 71 and causes rough grinder to swing out away from the work. The drive of the table, however, continues to complete the finishing grinding operation. When this has been completed, the limit switch LS—ER is contacted by its striker to close the circuit of finisher positioning motor 71 and causes the finishing grinder to swing away from the work. This action also closes contact FO in table drive reverse circuit and causes return of the table to its initial starting position. When the table on its return movement reaches such position, the limit switch LS—S is contacted by its striker to open the table drive circuit to stop the drive motor 86. The other poles to this stop switch close to enable manual reverse operation of the table through pressing table reverse button TR.

During a grinding cycle, the swinging arms 27 and 28, guided by the coaction of the template wheels 105 with the table template 14, are moved inward and outward to cause the abrading wheels 23 and 24 to follow the irregular or out-of-round contour of the work edge. As the arm 28 carrying the finishing wheel 24 swings inward and outward in following the irregular contour of the work edge, the speed of rotation of the work is varied, so that when the wheel is moving outward away from the table axis, the table speed is decreased, and when the abrading wheel is moving inward relative to the table axis, the table speed is increased. This is found to be a desirable action in the grinding of out-of-round work edges. This action is accomplished by connecting a speed change means in the table drive with the arm 28, in the present instance, so that a rearward swinging movement of the arm causes a decrease in the speed of table drive, and a forward movement of such arm causes an increase of such speed.

For the grinding of transversely rounded edges on the work, grinding wheels are used that have peripheral grooves corresponding substantially to the shape desired to be given the work edge, as shown in Fig. 6. In vertically adjusting the abrading wheels to properly register with the work edge, the screws 46 are adjusted to effect a raising or lowering of the heads 40. Should the wheel groove, by reason of wear, become too wide to impart the desired rounded edge to the work, the carrying head 40 may be given a slight transverse pivotal adjustment about the point 60 to impart a slight incline to the head and thus tend to correct the trouble. If it is desired to edge bevel the work, an abrading wheel with a beveled abrading surface, as shown at 114 in Fig. 17, is employed. This wheel contacts the top edge surface of the work with the work supporting table opposing the abrading pressure.

We wish it understood that our invention is not limited to any specific construction, arrangement or form of the parts, as it is capable of numerous modifications and changes without departing from the spirit of the claims.

Having thus described our invention, what we claim as new and desire to secure by United States Letters Patent is:

1. In a machine of the class described, means for holding and rotating a work plate to be edge ground, a template rotatable with said plate, a swinging arm, an abrading wheel and a template wheel carried by said arm and movable by swinging movements thereof into and out of edge engagement with the work plate and template, respectively, spring means for retracting the arm from abrading position, and means for returning the arm to abrading position, said last means being operable to impart a predetermined positive return movement to said arm and then to exert a yielding abrading pressure thereon.

2. In a machine of the class described, means for holding and rotating a work plate to be edge ground, an abrading wheel carrying arm swingable toward and from the axis of rotation of said means, template means for swinging the arm in accordance with the peripheral shape of the work plate, means for retracting the arm from operative grinding position, gravity means acting on the arm to yieldingly hold it in grinding position, and means operable to coact with said last means to render it inoperative when the arm is in retracted position, and also operable to cooperate therewith to positively return the arm a predetermined extent toward abrading position and then to render said gravity means active to yieldingly hold the arm in such position.

3. In a machine of the class described, a rotatable means for holding a work plate to be edge ground, an abrading wheel, an arm carrying the wheel and swingable to move it into and out of edge grinding relation to the work plate, spring means for moving the arm to retracted position, means for yieldingly holding the arm in grinding position, and means automatically operable to render said last means inoperative when the arm is in retracted position and to render it operative to perform its normal arm moving function when the arm has been moved a predetermined extent toward work grinding position.

4. In a machine of the class described, a rotatable means for holding a work plate to be edge ground, an abrading wheel, an arm carrying the wheel and swingable to move it into and out of edge grinding relation to the work plate, yielding means for moving the arm to retracted position, gravity means normally operative to move the arm to grinding position and cause the wheel to yieldingly engage the work plate edge, a clutch normally engageable with said last means to hold it from operation, and means operable through said clutch to move the arm a predetermined extent toward grinding position and then to release the clutch to permit normal operation of the gravity means.

5. In a machine of the class described, a swinging arm, an abrading wheel carried by said arm and movable thereby into and out of engagement with a work piece, retracting means for the arm, gravity means normally operable to overcome said first means and move the arm toward the work, and means operable to engage said gravity means and prevent its normal operation and at a predetermined position in the inward movement of the arm to release said gravity means and permit it to act normally.

6. In a machine of the class described, a rotatable table for holding a work plate to be edge ground, an abrading wheel mounted for movement into and out of edge grinding engagement with the plate, means normally holding the wheel out of plate edge engaging position, means yieldingly operable to oppose said means and move the wheel to plate edge engaging position, separate drive means for said table and wheel, and means operable to engage and cooperate with said yielding means to initially move the wheel to plate edge engaging position and then to release it and permit it to act alone to hold the wheel in edge engagement with the work plate.

7. In a machine of the class described, a rotatable table for holding a work plate to be edge ground, an abrading wheel mounted for movement into and out of edge grinding engagement with the plate, means normally holding the wheel out of plate edge engaging position, means yieldingly operable to oppose said first means and move the wheel to plate edge engaging position, separate drive means for said table and wheel, and means operable to render said yielding means inoperable to hold the wheel in engagement with the plate when a predetermined edge grinding operation has been completed.

8. In a machine of the class described, a rotatable table for holding a work plate to be edge ground, an abrading wheel mounted for movements into and out of edge grinding relation to a work plate on the table, separate means for driving the table and wheel, means acting to normally hold the wheel out of plate edge engaging position, means yieldingly acting to move the wheel to and hold it in plate edge engaging position, electrically driven means operable to engage and render said yielding means inoperative to move the wheel to plate edge engaging position, then to coact therewith to move it to plate edge engaging position and then to release said yielding means to permit it to normally act.

9. An arrangement as called for in claim 8, together with control means automatically operable at predetermined points in a rotation of the table to effect the various operations of said electrically driven means.

10. In a machine of the class described, a rotatable table for holding a work plate to be edge ground, an abrading wheel mounted for movements into and out of edge grinding relation to the work plate on the table, separate means for driving the table and wheel, means acting to normally hold the wheel out of plate edge engaging position, yielding means having a reciprocably movable member in connection with and normally operable to hold the wheel in plate edge engaging position, means operable at predetermined periods in an operation of the machine to cooperate with said last means first to render it inoperative to move the wheel to plate edge engaging position, then to positively move the wheel to such position and then to release such means to permit it to act.

11. In a machine of the class described, a rotatable table for holding a work plate to be edge ground, two abrading wheels successively positioned in circumferentially spaced relation around the table edge and each mounted for separate movements into and out of plate edge engaging positions and normally standing out of plate edge engaging position, separate means for driving said wheels in any position of in and out movement, separate means for yieldingly holding each wheel in plate edge engaging position, separate clutch means engageable with respective of said yielding holding means to prevent normal operation thereof and also operable therewith to positively move the respective wheels into substantially plate edge engaging position and then to release said yielding means to permit normal operation thereof, and controls for said clutch means automatically operable at predetermined points in a rotation of the table to effect successive actions of the clutch means.

12. An arrangement as called for in claim 11 wherein the wheels are successively disengaged from the plate edge, together with means for stopping the driving of the table and reversing its drive a predetermined extent when both wheels have been moved out of plate edge engaging positions.

WILLIAM A. REASER.
ELMER A. ZIEMS.
JOHN M. CHRISTMAN.

REFERENCES CITED

The following references are of record in the file of this patent:

UNITED STATES PATENTS

| Number | Name | Date |
|---|---|---|
| 447,700 | Schulze-Berge | Mar. 3, 1891 |
| 449,131 | O'Gorman | Mar. 31, 1891 |
| 481,335 | Theis | Aug. 23, 1892 |
| 1,228,418 | Eaton | June 5, 1917 |
| 1,256,746 | Post | Feb. 19, 1918 |
| 1,716,115 | Clark et al. | June 4, 1929 |
| 1,778,977 | Kosfeld | Oct. 21, 1930 |
| 1,862,379 | Koestlin | June 7, 1932 |
| 2,010,922 | Leonard | Aug. 13, 1935 |
| 2,028,718 | Heine | Jan. 21, 1936 |
| 2,091,456 | Rybick | Aug. 31, 1937 |
| 2,315,104 | Baldenhofer | Mar. 30, 1943 |